United States Patent [19]
Demouzon et al.

[11] Patent Number: 5,871,176
[45] Date of Patent: Feb. 16, 1999

[54] REDUNDANT FRONT SUSPENSION SYSTEM FOR A TURBOSHAFT ENGINE

[75] Inventors: Françis Michel Demouzon, Cesson; René Pierre Fer, Dammarie Les Lys; Patrick Jean Alibert Huet, Lisses; Laurent Pierre Elysée Gaston Marnas, Vaux Le Penil, all of France

[73] Assignee: Societe Nationale D'Etude et de Construction de Moteurs D'Aviation "Snecma", Paris, France

[21] Appl. No.: 974,559

[22] Filed: Nov. 19, 1997

[30]  Foreign Application Priority Data

Nov. 21, 1996 [FR] France ................... 96 14190

[51] Int. Cl.⁶ ..................... B64D 27/26
[52] U.S. Cl. .............. 244/54; 248/554; 60/39.31
[58] Field of Search ............ 244/54, 55, 53 R; 248/554–557; 60/39.31

[56]  References Cited

U.S. PATENT DOCUMENTS

| | | | |
|---|---|---|---|
| 3,907,220 | 9/1975 | Amelio | 244/54 |
| 4,065,077 | 12/1977 | Brooks . | |
| 4,560,122 | 12/1985 | Parkinson et al. | 244/54 |
| 5,303,880 | 4/1994 | Cencula et al. | 244/54 |
| 5,474,258 | 12/1995 | Taylor et al. | 244/54 |

FOREIGN PATENT DOCUMENTS

| | | |
|---|---|---|
| 2217549 | 9/1974 | France . |
| 2599708 | 12/1987 | France . |
| 2680353 | 2/1993 | France . |
| WO 93/11041 | 6/1993 | WIPO . |

*Primary Examiner*—Galen L. Barefoot
*Attorney, Agent, or Firm*—Oblon, Spivak, McClelland, Maier & Neustadt, P.C.

[57]  ABSTRACT

A redundant front suspension system for a turboshaft engine mounted on a pylon of an aircraft comprises a primary suspension device forming the normal front suspension of the engine, and an emergency suspension device. The primary suspension device comprises a base member secured to the pylon and having a suspension shaft which co-operates with the intermediate casing of the engine, and thrust take-up rods connect the intermediate casing to the base member. The emergency suspension device comprises an additional member which is interposed between the pylon and the base member of the primary device and which has a second shaft at its forward end extending parallel to the longitudinal axis X of the engine, the second shaft being received with clearance in a bore provided in the intermediate casing and being equipped with means for enabling take-up of forces along the X, Y and Z axes in the event of failure of an element of the primary suspension device.

3 Claims, 6 Drawing Sheets

5,871,176

REDUNDANT FRONT SUSPENSION SYSTEM FOR A TURBOSHAFT ENGINE

BACKGROUND OF THE INVENTION

1. Field of the invention

The invention relates to a redundant front suspension system for a turboshaft engine mounted on a pylon carried by an aircraft, the word "front" being defined with respect to the direction of flow through the engine to denote that part of the engine which is remote from the flow exhaust zone.

2. Summary of the Prior Art

As is known, an aircraft turboshaft engine is attached to a pylon by means of a front suspension device and a rear suspension device so that the pylon can effect mechanical transmission of the forces between the engine and the aircraft structure. These suspension devices have to withstand the mechanical forces acting along the vertical axis Z due to the weight of the engine, and the dynamic forces acting along the transverse axis Y caused by the movements of the aircraft. The loads produced by the engine thrust and acting along the longitudinal axis X are transmitted to one of the suspension devices by inclined thrust take-up rods disposed on either side of the engine.

Also, for obvious safety reasons the suspension of the turboshaft engine must possess redundancy. For this purpose there are two possible solutions. One is to duplicate all the components of the suspension so that each is adapted to withstand the fixed forces by itself, and the other is to add stand-by components which are arranged to withstand the forces only in the event of a failure of the main suspension.

FR-A-2 680 353 discloses a rear connection structure for attaching a turbojet engine to a pylon wherein a mounting is secured to the pylon and is connected to the engine exhaust casing by three suspension rods, the mounting comprising two parts which are fitted one in the other and which are dimensioned such that each is able to take up all the forces transmitted between the casing and the pylon.

FR-A-2 599 708 also discloses a rear connection device for a turbojet engine, wherein there is a provided, in addition to the three known rods, a fourth safety rod which does not take up any load under normal conditions.

Both of these documents relate only to the rear suspension, and make no reference to means for taking up the considerable X-axis thrust loads in the event of failure of a thrust take-up rod or of the suspension means which normally deals with the load of such rods.

SUMMARY OF THE INVENTION

It is an object of the invention to provide a redundant front suspension system for a turboshaft engine mounted on a pylon wherein the normal front suspension is provided with a stand-by component adapted to take the forces acting along the X, Y and Z-axes in the event of a failure of the normal suspension.

Accordingly, the invention provides a redundant front suspension system for a turboshaft engine mounted on a pylon carried by an aircraft, said suspension system comprising a primary suspension device which functions as the normal front suspension of said engine, and an emergency suspension device, said primary suspension device comprising a base support which is secured to said pylon and is connected to the intermediate casing of said engine, and thrust take-up rods which are interposed between said base support and said engine, said base support being adapted to provide mechanical transmission of the forces acting along a transverse axis Y and a vertical axis Z between said intermediate casing and said pylon as well as transmission to said pylon of the engine thrust forces which act along a longitudinal axis X and which are transmitted by said thrust take-up rods, and said emergency suspension device comprising a member which is interposed between said pylon and said base support and which has a shaft at its forward end extending parallel to said longitudinal axis X, said intermediate casing being provided with a bore in which said shaft is received with clearance, and said shaft being equipped with means for enabling take-up of the forces transmitted along the X, Y and Z axes by said intermediate casing in the event of failure of any of the elements of said primary suspension device.

Preferred features and advantages of the invention will become apparent from the following description of a preferred embodiment with reference to the accompanying drawings.

DESCRIPTION OF THE PREFERRED EMBODIMENT

Figure 1:
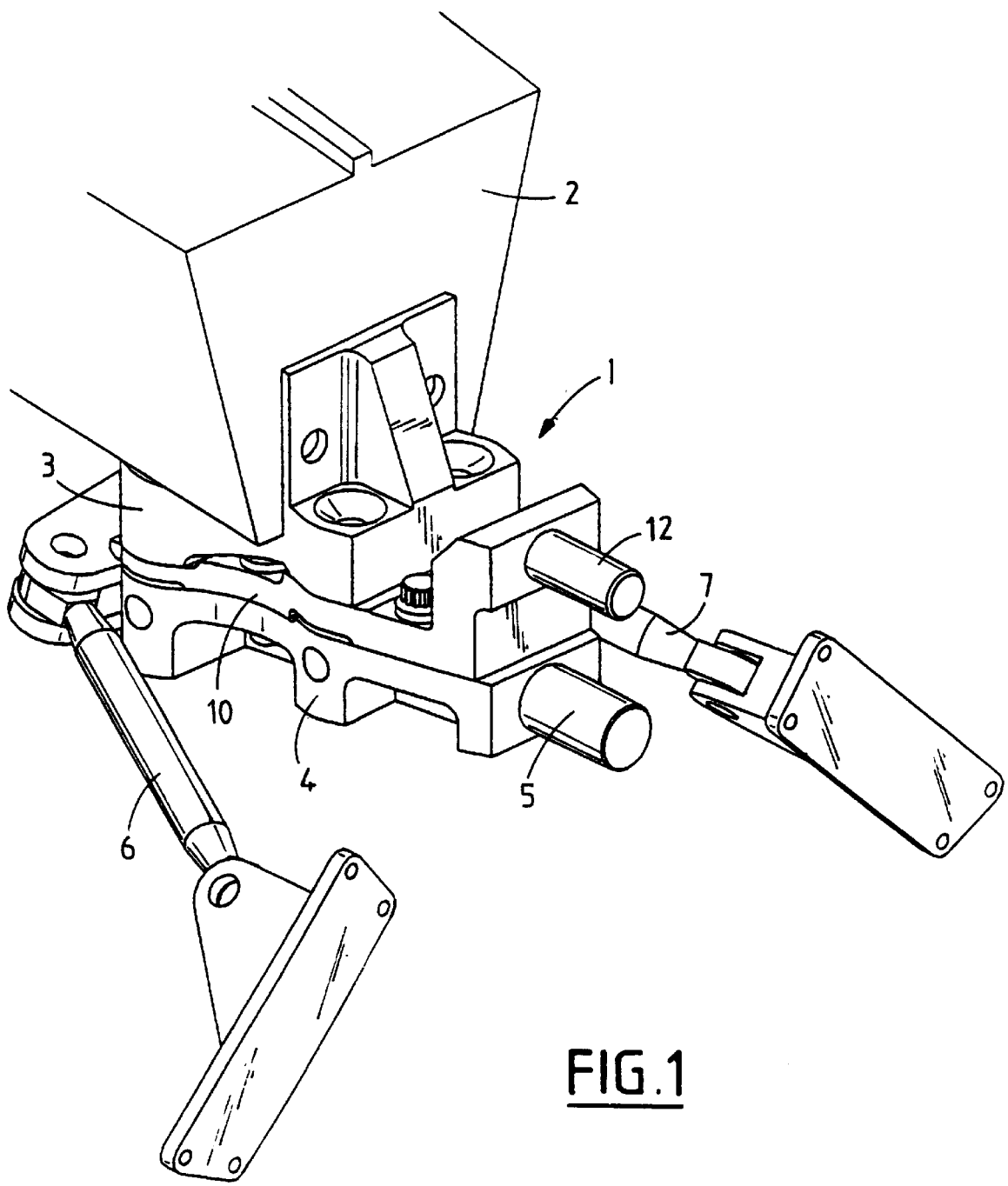
FIG. 1 is a perspective view of a preferred embodiment of the redundant front suspension system in accordance with the invention, the drawing showing a portion of the aircraft pylon to which the system is attached but not showing any of the turboshaft engine for the sake of clarity.

FIG. 1 shows a redundant front suspension system 1 for mounting a turboshaft engine on the pylon 2 of an aircraft. The engine is not shown for the sake of clarity, but it is sufficient to know that the front suspension point of the engine is located on the intermediate casing thereof.

Figure 5:
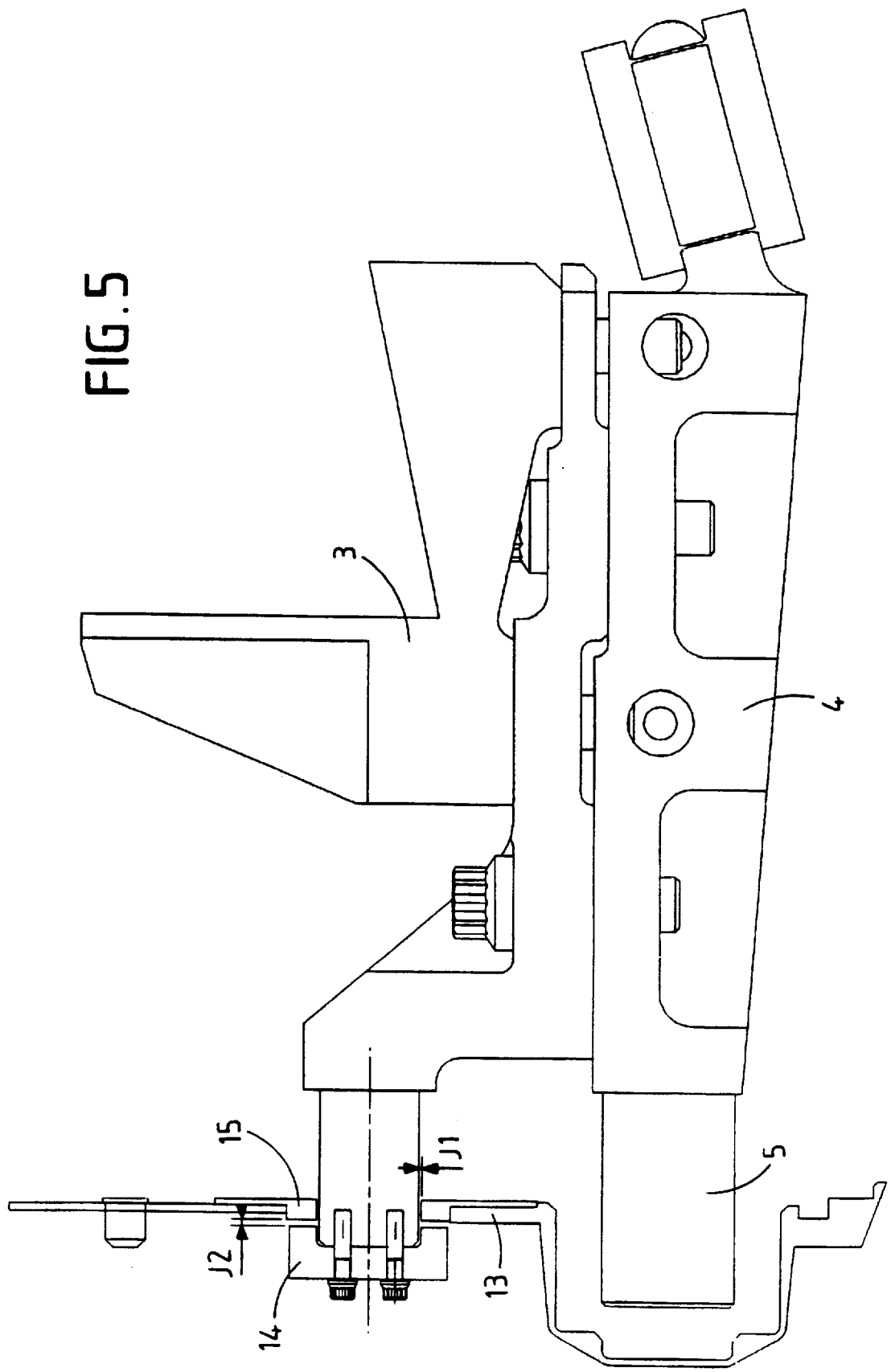
FIG. 5 is a side view of the assembled suspension system.

The pylon 2 is fitted with a heel 3 to which the suspension system 1 is secured as is shown in FIGS. 1 and 5.

Figure 2:
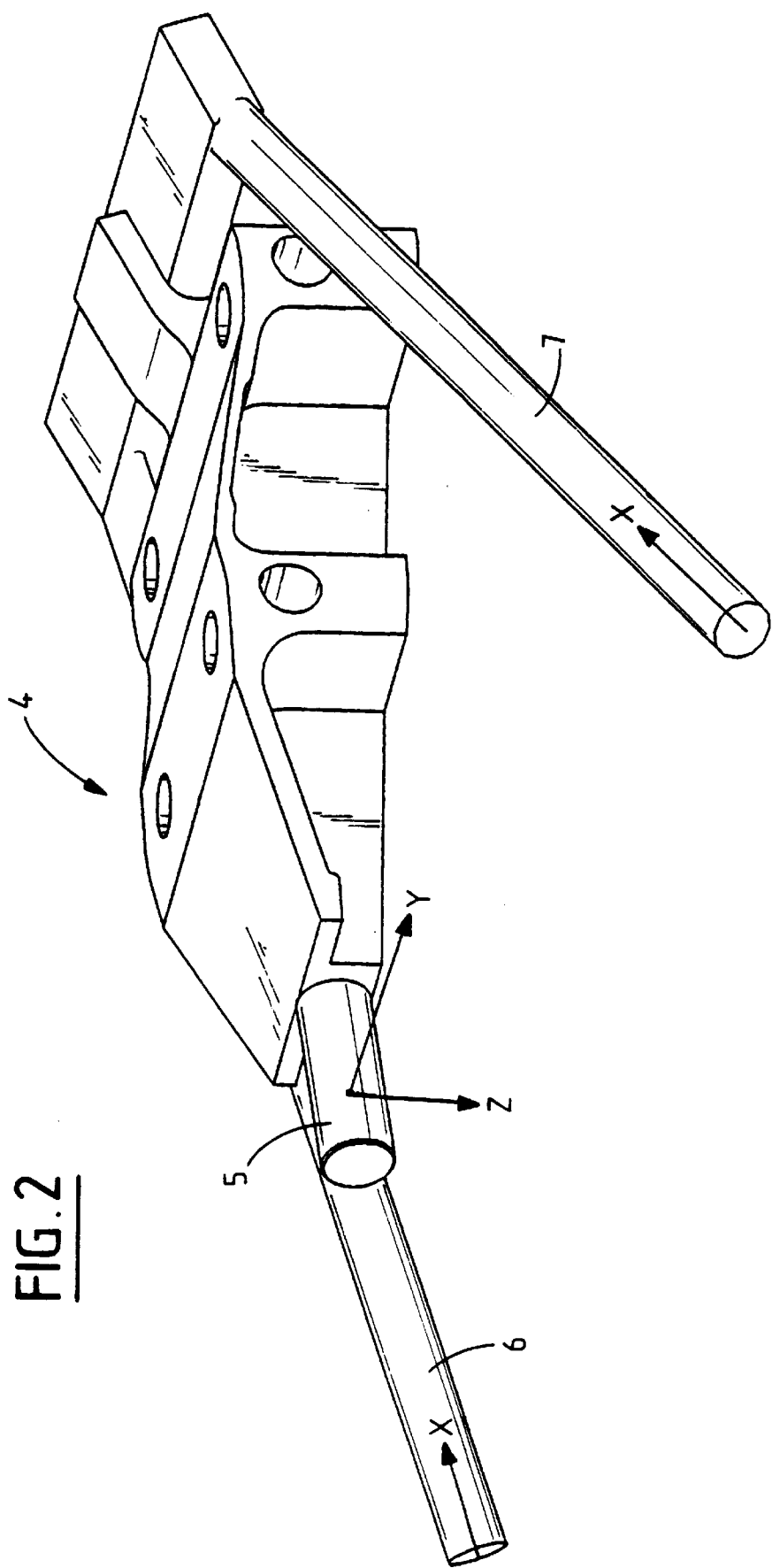
FIG. 2 is a perspective view of the primary suspension device of the system shown in FIG. 1, including the thrust take-up rods.
Figure 3:
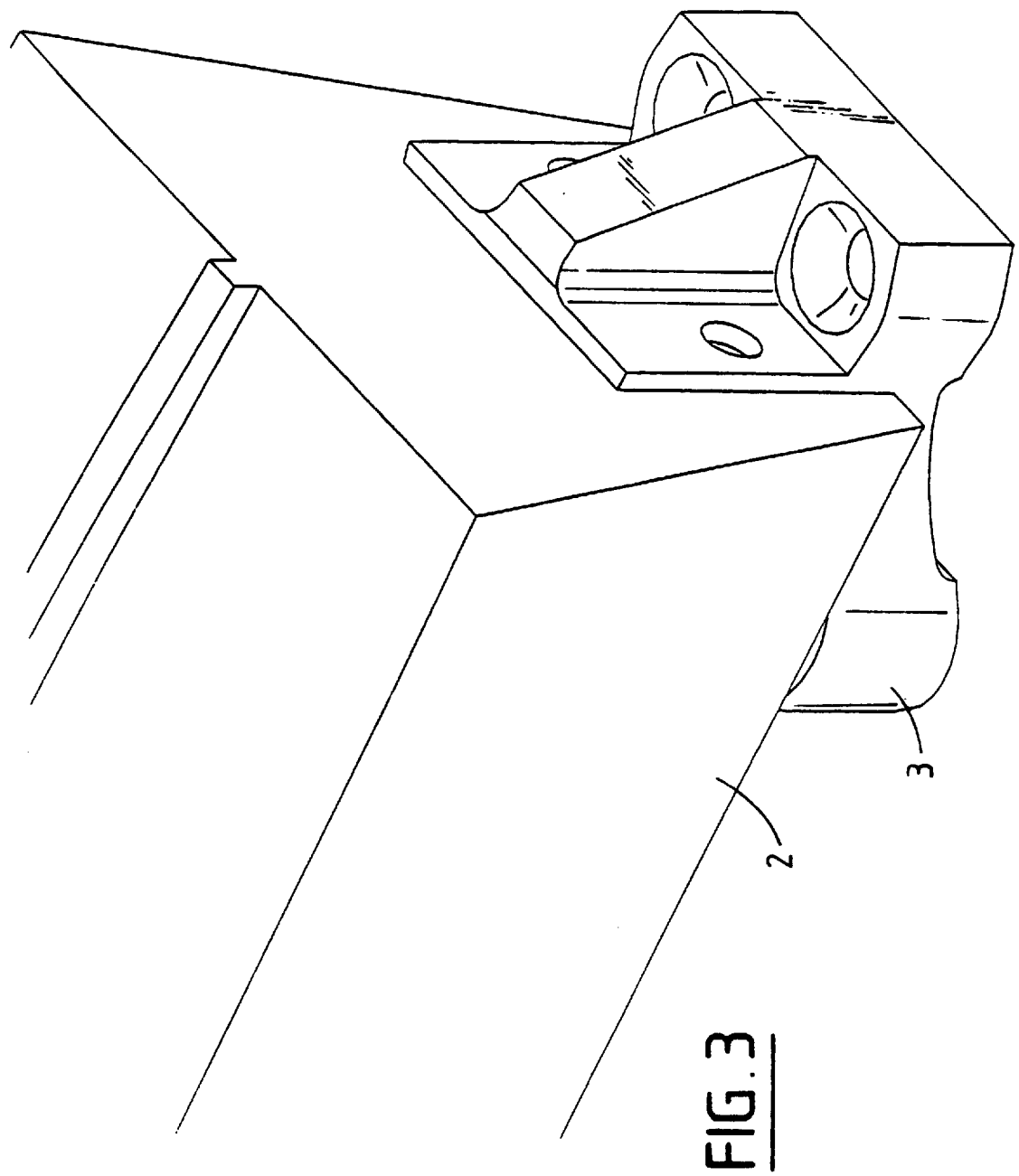
FIG. 3 shows part of the aircraft pylon and its heel on which the suspension system is mounted.
Figure 4:
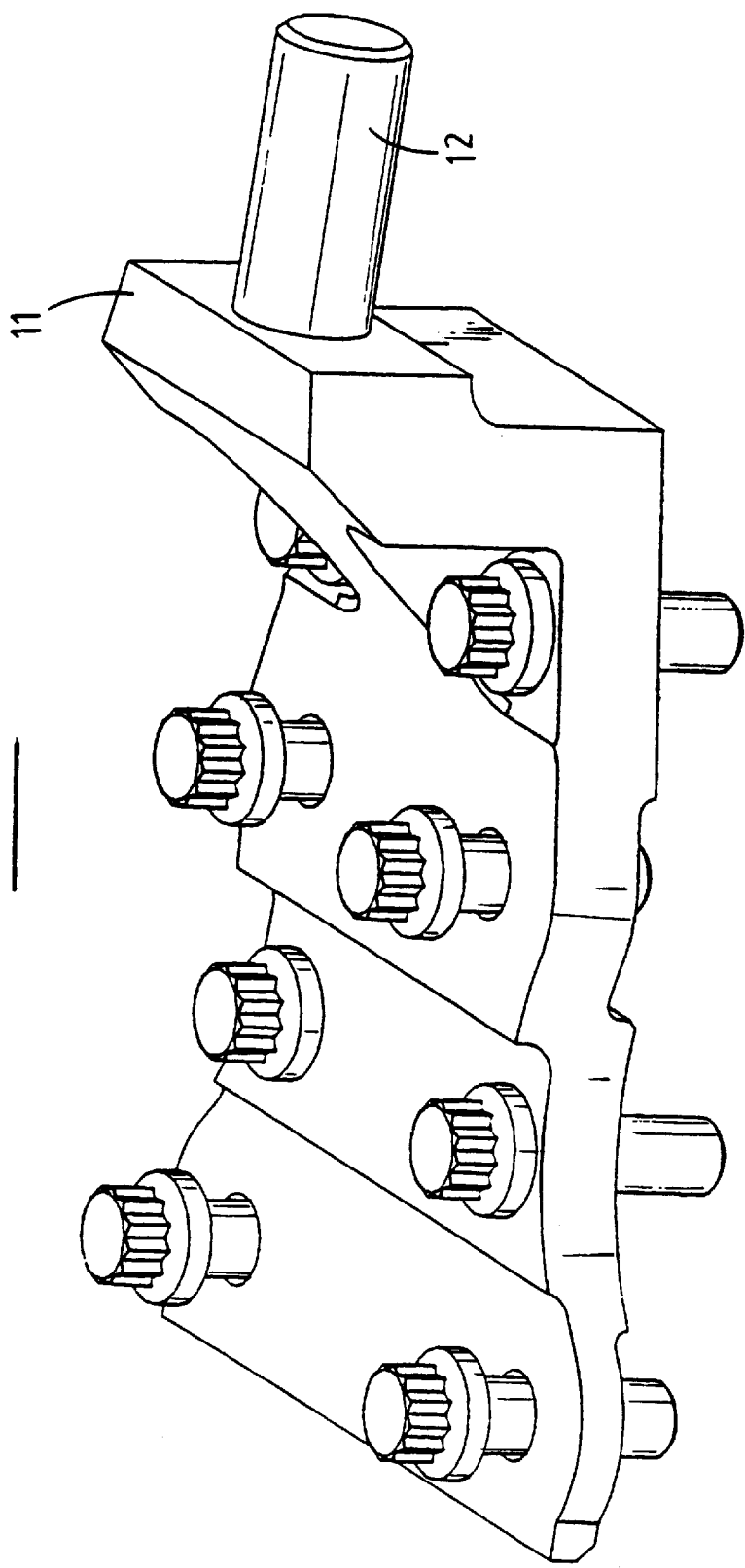
FIG. 4 is a perspective view of the emergency suspension device of the suspension system.

The suspension system 1 includes a primary suspension device which forms the normal front suspension of the turboshaft engine and which comprises a base support 4 as shown in FIGS. 1, 2 and 5. The base support 4 is usually fixed under the heel 3, and extends towards the front of the aircraft in the direction of flight. At its front end the base support 4 has a support shaft 5 which extends forwardly in the direction of the longitudinal axis X of the aircraft reference trihedron and which constitutes the forward suspension shaft for the engine. The shaft 5 serves to take up the forces acting along the vertical axis Z and the transverse axis Y of the reference trihedron, these forces resulting from the weight of the engine, and from the dynamic forces due to vertical and lateral accelerations caused by vertical and lateral movements of the aircraft. At the rear end of the base support 4 are attached thrust take-up rods 6, 7 which extend forwardly at an angle to the longitudinal axis X and have their front ends secured laterally to the intermediate casing of the engine. These rods 6, 7 transmit the forces produced by the engine thrust, which acts in the direction of longitudinal axis X of the reference trihedron .

In addition to the normal suspension just described, the front suspension system 1 includes an emergency suspension device 10 which operates only in the event of a failure of the normal suspension.

The emergency device 10 is in the form of a unitary member interposed between the under side of the heel 3 and the top surface of the base support 4 and having a vertical abutment 11 at its front end from which a shaft 12 extends parallel to the longitudinal axis X at a position above the shaft 5. This additional member 10 is formed with a plurality of holes for the passage of fixing bolts for re-establishing the interface between the pylon 2 and the base support 4.

Figure 6:
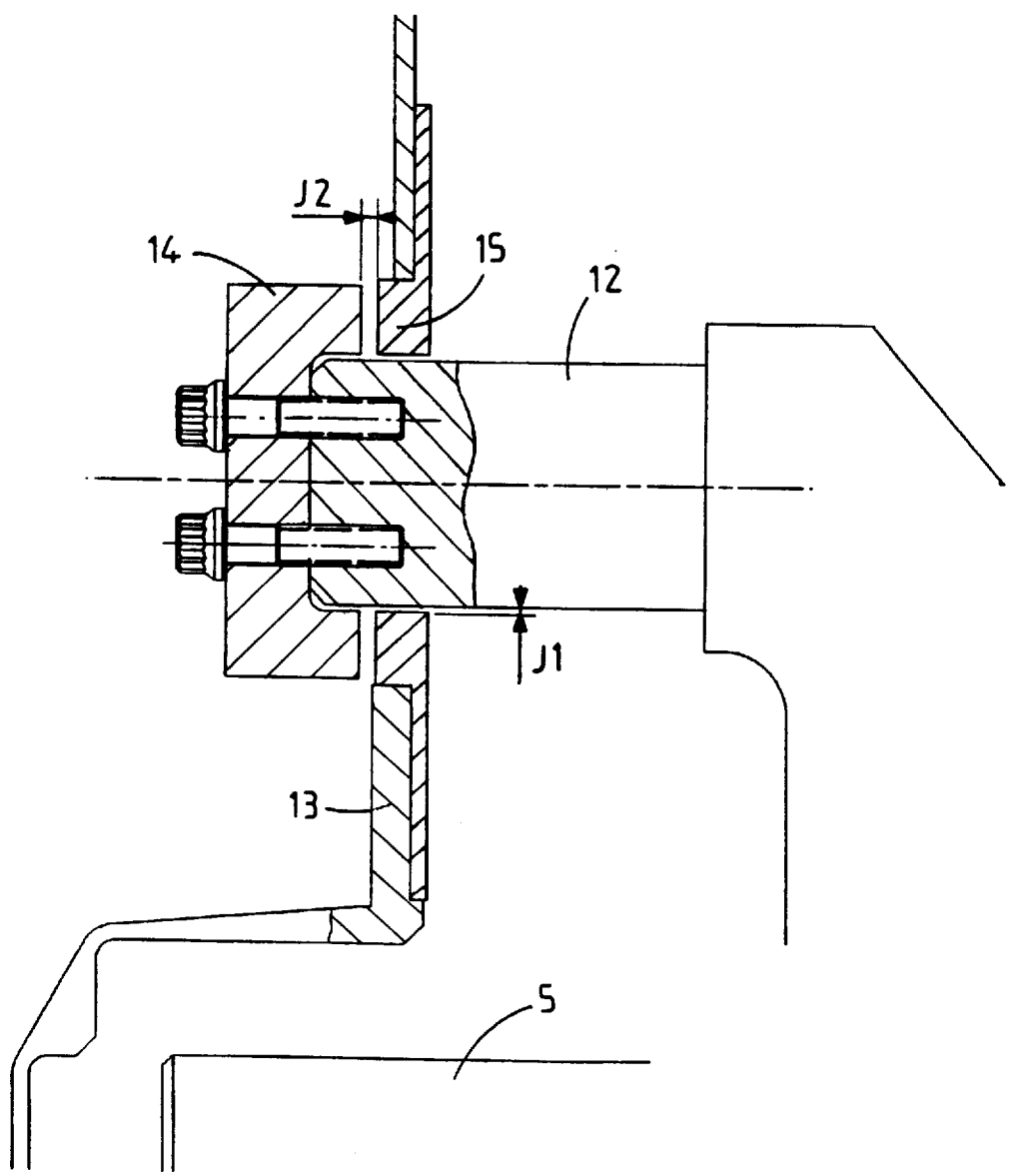
FIG. 6 is an enlarged view, partly in section, of a part of the emergency suspension device.

As shown in FIGS. 5 and 6, the shaft 12 is received, with clearance, in an appropriate bore provided in the intermediate casing 13 of the engine, and means is provided to enable the shaft 12 to take up the X-axis forces in the event of either of the thrust take-up rods 6, 7 rupturing. FIG. 5 shows an example of such means wherein an abutment 14 is fixed to the end of the shaft 12 and a cover plate 15 is secured to the casing 13 around the shaft 12. A clearance J1 is allowed between the shaft 12 and the cover plate 15 and a clearance J2 is allowed between the abutment 14 and the cover plate 15 so that the emergency device remains free from loads in normal operation.

In the event of a failure of the normal suspension because of a rupture of the support shaft 5 of the base support 4, the Y and Z-axes forces are taken up by the shaft 12 while the X-axis loads continue to be taken up by the rods 6, 7.

In the event of a rupture of one of the rods 6, 7, the X-axis loads are taken up by the abutment 14 and the cover plate 15, whereas the Y and Z-axes forces continue to be taken up by the shaft 5.

Finally, in the event of a rupture of the shaft 5 and either of the rods 6, 7, all the forces and loads are transmitted from the intermediate casing 13 to the pylon 2 by way of the emergency device 10.

We claim:

1. A redundant front suspension system for a turboshaft engine mounted on a pylon carried by an aircraft, said suspension system comprising a primary suspension device which functions as the normal front suspension of said engine, and an emergency suspension device, said primary suspension device comprising a base support which is secured to said pylon and is connected to the intermediate casing of said engine, and thrust take-up rods which are interposed between said base support and said engine, said base support being adapted to provide mechanical transmission of the forces acting along a transverse axis Y and a vertical axis Z between said intermediate casing and said pylon as well as transmission to said pylon of the engine thrust forces which act along a longitudinal axis X and which are transmitted by said thrust take-up rods, and said emergency suspension device comprising a member which is interposed between said pylon and said base support and which has a shaft at its forward end extending parallel to said longitudinal axis X, said intermediate casing being provided with a bore in which said shaft is received with clearance, and said shaft being equipped with means for enabling take-up of the forces transmitted along the X, Y and Z axes by said intermediate casing in the event of failure of any of the elements of said primary suspension device.

2. A suspension system according to claim 1, wherein for the purpose of taking up the forces along said longitudinal axis X an abutment is secured to the end of said shaft and a cover plate is secured to said intermediate casing around said shaft such that a first clearance is formed between said shaft and said cover plate and a second clearance is formed between said abutment and said cover plate.

3. A suspension system according to claim 1, wherein said member interposed between said pylon and said base support is provide with a plurality of holes for the passage of fixing bolts for re-establishing the interface between said pylon and said base support.

\* \* \* \* \*